United States Patent [19]

Shaw

[11] E Re. 31,379

[45] Reissued Sep. 13, 1983

[54] COMBINED PRESSURE MATCHING AND CAPACITY CONTROL SLIDE VALVE ASSEMBLY FOR HELICAL SCREW ROTARY MACHINE

[75] Inventor: David N. Shaw, Unionville, Conn.

[73] Assignee: Dunham-Bush, Inc., West Hartford, Conn.

[21] Appl. No.: 197,401

[22] Filed: Oct. 16, 1980

Related U.S. Patent Documents

Reissue of:

[64] Patent No.: 4,222,716
Issued: Sep. 16, 1980
Appl. No.: 44,433
Filed: Jun. 1, 1979

[51] Int. Cl.[3] ..... F04B 49/02

[52] U.S. Cl. ..... 417/310; 417/315

[58] Field of Search ..... 417/310, 315, 309; 418/201, 202

[56] References Cited

U.S. PATENT DOCUMENTS

| | | | |
|---|---|---|---|
| 3,088,659 | 5/1963 | Nilsson | 418/201 |
| 3,432,089 | 3/1969 | Schibbye | 417/310 |
| 3,738,780 | 6/1973 | Edstrom | 417/310 |
| 3,936,239 | 2/1976 | Shaw | 417/315 |
| 4,042,310 | 8/1977 | Schibbye | 418/201 |
| 4,080,110 | 3/1978 | Szymaszek | 417/310 |

*Primary Examiner*—Robert W. Jenkins
*Attorney, Agent, or Firm*—Sughrue, Mion, Zinn, Macpeak & Seas

[57] ABSTRACT

A helical screw rotary compressor or expander rotatably mounts intermeshed helical screw rotors within intersecting bores of a casing. An axially extending recess provided within the barrel portion of the casing in open communication with the bore bears a slide valve member whose inner face is complementary to the envelope of the casing. The slide valve member controls communication between the working chamber defined by the rotors and the casing to the outlet port and bears means at the end in communication with the outlet port for sensing the closed thread pressure adjacent to the end of the slide valve member closing off the outlet port. Comparison of that closed thread pressure to the outlet port pressure permits controlled shifting of the slide valve member to prevent overcompression and undercompression, when the unit acts as a compressor, or underexpansion or overexpansion when the unit acts as an expander. The slide valve member carries a bore parallel to its longitudinal axis which bears a cylindrical volume capacity control valve body which shifts to vary flow through axially spaced channels, selectively communicating the working fluid inlet to the bores bearing the intermeshed helical screw rotors. The slide valve member and the volume capacity control valve body carried thereby are independently movable.

5 Claims, 3 Drawing Figures

COMBINED PRESSURE MATCHING AND CAPACITY CONTROL SLIDE VALVE ASSEMBLY FOR HELICAL SCREW ROTARY MACHINE

Matter enclosed in heavy brackets [ ] appears in the original patent but forms no part of this reissue specification; matter printed in italics indicates the additions made by reissue.

FIELD OF THE INVENTION

This invention relates to helical screw positive displacement rotary compressors and expanders, and more particularly to a machine employing a single, composite slide valve assembly for varying compressor capacity and for matching the discharge or outlet pressure to the pressure of the machine at discharge corresponding to load conditions of the system within which the unit is employed.

DESCRIPTION OF THE PRIOR ART

Helical screw, positive displacement rotary compressors and expanders have long employed longitudinally shiftable slide valves mounted to the compressor casing and carried within longitudinally extending recesses parallel to barrel portions of the casing which, in turn, bear intermeshed helical screw rotors which rotate about their parallel axes within suitable casing bores.

While such slide valves have been employed primarily to vary the capacity of the machine, whether it be a compressor or expander as in U.S. Pat. No. 3,088,659 to H. R. Nilson et al and entitled "Means for Regulating Helical Rotary Piston Engine," slide valves have been provided for other purposes. Specifically, in U.S. Pat. No. 3,936,239 issuing to the applicant and assigned to the common assignee on Feb. 3, 1976, and entitled "Undercompression and Overcompression Free Helical Screw Rotary Compressor" the axially shiftable slide valve bears a port at the end of the slide valve adjacent to the discharge side of the machine which opens to the trapped volume of the working fluid, in the case of the compressor therefore opening to the compression process, just before uncovering of the closed thread to the discharge port, and compares that pressure with the line pressure at the discharge port. Means are provided for shifting the slide valve to balance the pressures and in the case of a unit functioning as a compressor to prevent overcompression and undercompression of the working fluid.

Further, while U.S. Pat. No. 3,936,239 shows a machine of this type in which multiple, separate slide valves of an identical nature are employed, depending upon the direction of rotation of the unit functioning as a compressor, the slide valves functioning alternatively in a pressure matching mode.

Attempts have been made in such helical screw rotary compressors and expanders to change the volume ratio of the unit and therefore its capacity by permitting a portion of the uncompressed or unexpanded refrigerant vapor, depending upon whether the unit is functioning as a compressor or expander, to return to the inlet side of the machine and to therefore vary the volumetric capacity of the machine. U.S. Pat. No. 4,042,310 issuing Aug. 16, 1977, to Hjalmar Schibbye entitled "Screw Compressor Control Means" is representative of a positive displacement rotary helical screw machine incorporating such means. In U.S. Pat. No. 4,042,310, a plurality of longitudinally extending bores are provided within the casing housing the intermeshed helical screw rotors and adjacent intersecting bores with a plurality of longitudinally spaced slots intercommunicating the rotor bearing bores with the smaller diameter bores which slidably support a tubular piston functioning as a spring biased valve member which is displaceable axially within its bore to progressively open up the slot and thus a portion of the compression or expansion chamber to the inlet side of the machine and to thereby vary the volumetric capacity of the unit, whether it be a compressor or expander.

It is, therefore, a primary object of this invention to provide an improved positive displacement helical screw rotary machine which employs a single slide valve assembly to provide both unit volumetric capacity control and to balance the closed thread or working chamber pressure to the line pressure on the discharge side of the machine.

It is a further object of the present invention to provide an improved, multiple function slide valve assembly for a positive displacement helical screw rotary compressor or expander in which capacity control and pressure matching functions are effected independently and without interference with each other in a simplified manner.

SUMMARY OF THE INVENTION

The present invention is directed to a positive displacement helical screw rotary machine in either compressor or expander form wherein a casing is provided with a barrel portion defined by intersecting bores, with coplanar axes located between axially spaced end walls and having inlet and outlet ports communicating with the bores at opposite ends. Helical screw rotors, each having grooves and lands, are mounted for rotation within respective bores with the lands and grooves of respective rotors intermeshed. An axially extending recess is provided within the barrel portion of the casing in open communication with the bores and a slide valve member is mounted for axial sliding within the recess, with the inner face of the slide valve member being complementary to the envelope of that portion of the bores of the casing structure confronted by the opening of the recess. The slide valve member communicates the bore portion of the casing structure with the slide valve member in sealing relation with the confronting rotor structure. The outlet port has at least a portion located in the barrel portion of the casing structure with the slide valve member being movable between extreme positions in which the outlet port is opened and closed. The slide valve member is of sufficient length to cover the entire remaining length of the confronting portion of the rotor structure throughout the range of movement of the slide valve member between its extreme positions. A port or other pressure sensing means is provided adjacent to the end of the slide valve member closing off the outlet port to the closed thread for sensing the pressure of the working fluid within the closed thread just upstream from the outlet port. Means are further provided for comparing the pressure of the outlet port to the closed thread pressure and for automatically shifting the slide valve member axially to equalize these pressures to prevent undercompression or overcompression of the working fluid when the unit is functioning as a compressor and for preventing underexpansion or overexpansion of the working fluid when the unit is functioning as an expander to maximize the compression and expansion efficiency of the machine is respective modes.

Preferably, the slide valve member carried a sensing port opening to the closed thread and conduit means within the slide valve member communicates with the closed pressure sensing port to the means external of the unit for causing comparison of the unit outlet pressure with the gas pressure of the closed thread just upstream of the outlet port. The slide valve member is preferably shifted axially by a power piston slidable within a cylinder and connected to the slide valve member by a piston rod. A pilot valve responsive to the pressure differential may control the flow of a motive fluid to and from respective sides of the power piston to shift the slide valve member so as to balance the two gas pressures.

The improvement resides in providing an axial bore within the slide valve member and a plurality of axially spaced overflow channels in the slide valve inner face partially defining the envelope of the intermeshed screw rotors and communicating the slide valve bore to the intermeshed helical screw rotors through the inner face of the slide valve. A shiftable cylindrical valve body is movably disposed in the slide valve member bore in sealing fashion and bears means responsive to shifting of the valve body for selectively covering and uncovering the overflow channels and communicating the slide valve member bore to the working chambers of the intermeshed helical screw rotors. Means are provided for communicating the slide valve member bore to the inlet port for returning some of the working fluid to the machine inlet prior to being closed off by the intermeshed helical screw rotors, thereby varying the volumetric capacity of the machine.

DESCRIPTION OF THE PREFERRED EMBODIMENT

Figure 1:
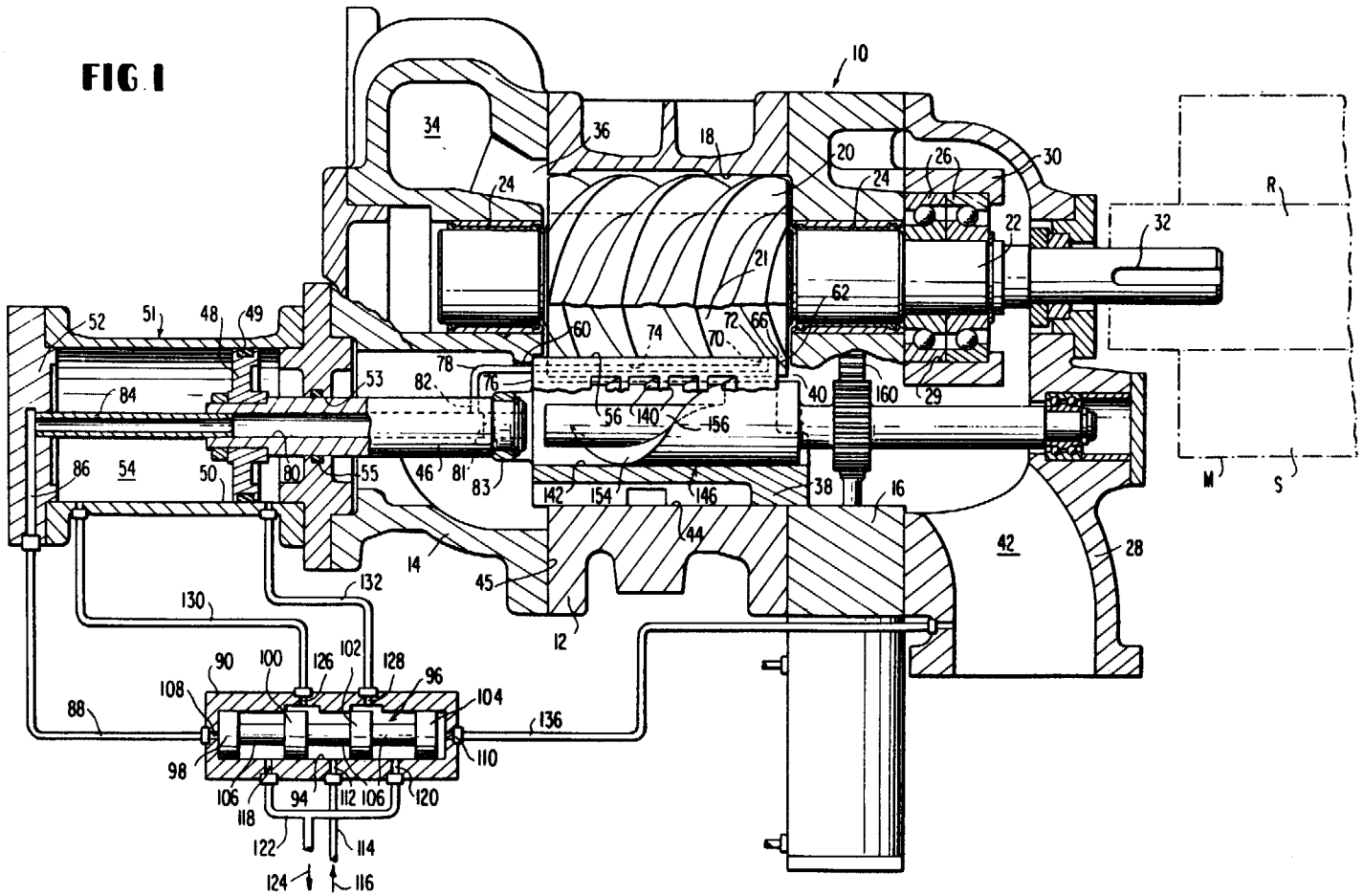
FIG. 1 is vertical sectional view of a helical screw rotary machine in compressor mode employing the combined pressure matching and volumetric capacity control slide valve assembly of the present invention and forming one embodiment of the present invention with the machine functioning at full capacity.
Figures 2, 3:
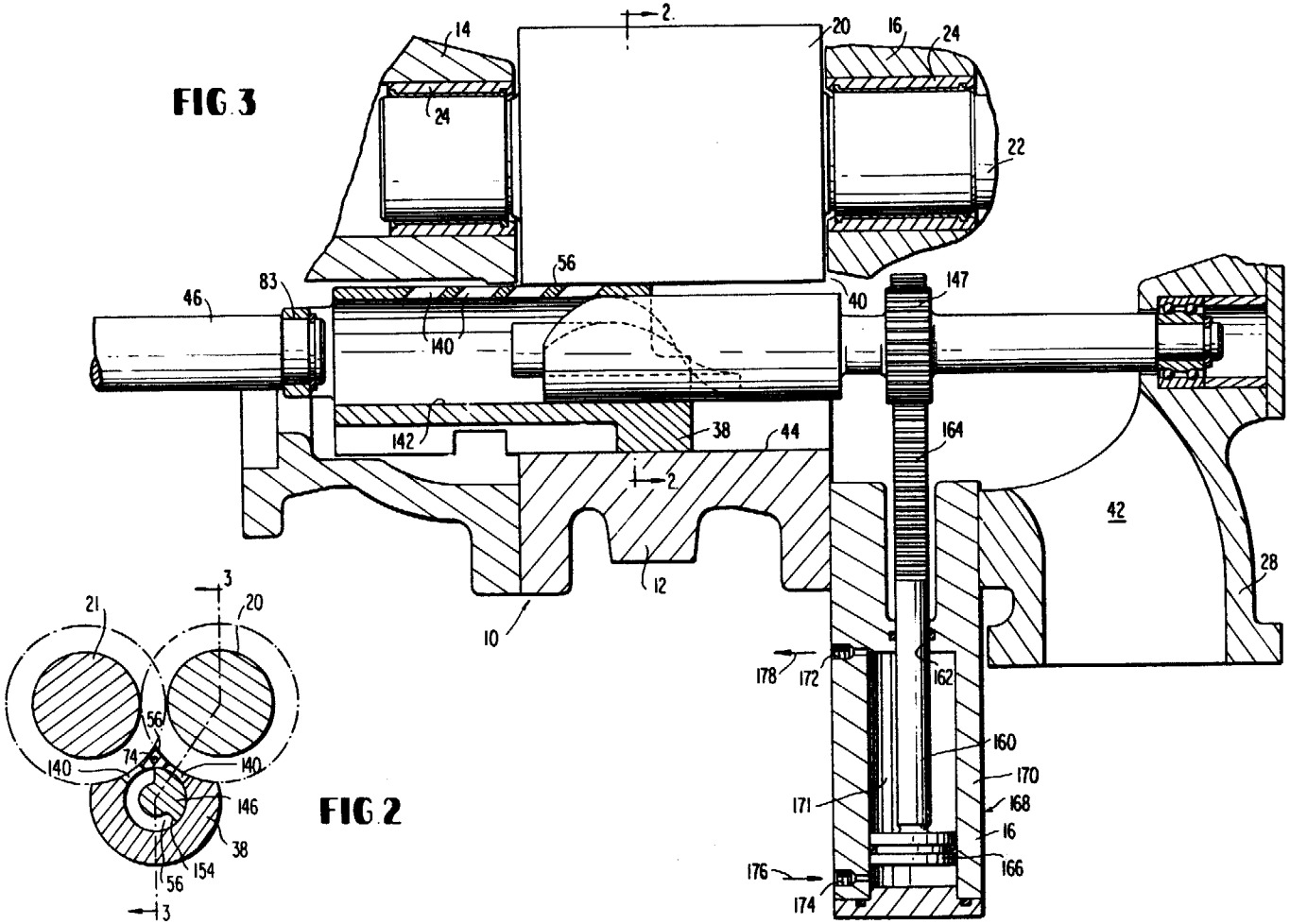
FIG. 2 is a sectional view of a portion of the machine of FIG. 1 taken about line 2—2.
FIG. 3 is an enlarged sectional view of the machine similar to that of FIG. 1 with the machine in compressor mode under reduced capacity conditions.

FIGS. 1 to 3 show one embodiment of the present invention in which a helical screw rotary machine is illustrated as functioning as a compressor under different capacity conditions. The figures are otherwise identical in all respects. The helical screw rotary machine, indicated generally at 10, comprises a casing or housing structure having a central, cylindrical barrel section 12 located between and sealingly connected to inlet end wall section or end plate 14 and outlet end wall section or end plate 16 and defining in this case a working fluid compression space or working space formed by two intersecting bores. One bore 18 is illustrated as carrying a helical screw rotor 20 in mesh with a second helical screw rotor 21 having an axis coplanar thereto and extending through the barrel portion 12 of the casing structure. Both male and female rotors are provided with helical lands and intervening grooves and are mounted for rotation in the bores, about their axes, by way of suitable bearings. The helical screw rotor 20 is mounted for rotation on shaft 22, being supported by a sleeve bearing 24 defined by end wall section 14 and by means of anti-friction bearings 26 mounted with a bore 29 of sleeve 30. Sleeve 30 is an integral cast component of end bell 28 on the discharge side of the machine. Shaft 22 extends through the end bell 28 at the right and is connected by way of spline 32 preferably to a two speed synchronous induction electric drive motor indicated schematically at M for providing the motive force for driving the rotors when the machine is used as a compressor. Alternatively, when the machine is used as an expander, if the two speed electric motor comprises a synchronous induction electric machine or its equivalent, it may function as a generator to permit electrical output to the electrical network feeding the same.

The unit 10 is provided with an inlet or intake passage 34 within the end wall section 14 and enters the working chamber by way of inlet port 36 such that the working fluid in vapor form, as for instance a refrigerant R22, may be compressed within a "closed thread" working space formed by the intermeshed helical lands and grooves or respective rotors 20 and 21.

It is a characteristic of the helical screw rotors of such machines that the flanks of the lands of the male rotors are convexly curved with their intervening grooves lying substantially outside the pitched circle of the male rotor, while the lands of the female rotor are concavely curved, with their intervening grooves lying substantially inside the pitched circle of the female rotor. It is a further characteristic of such rotors as in the illustrated embodiment that the effective wrap angle of the lands is less than 360°.

The casing or housing structure is provided with a high pressure discharge or outlet port 40, the major portion of which lies on one side of a plane passing through the axes of the rotors 20, 21, with the outlet or discharge port 40 being located at least partially within the outlet end wall section 16 of the machine. The outlet port 40 is in fluid communication with the outlet passage 42 which extends from the outlet end wall section 16 of the machine to end bell 28. It may be seen, therefore, that the inlet port 36 and the outlet port 40 are on opposite sides of the plane passing through the rotor axes. The machine as illustrated in FIGS. 1 and 2, is oriented horizontally, and in the illustrated embodiment, the barrel section 12 of the casing structure is further provided with a centrally located, longitudinally extending, cylindrical recess 44 which is in open communication, at one end, with the outlet port 40 and at the other end extends beyond the end wall 45 of the inlet end wall portion or section 14 of the casing structure and opens to the inlet passage 34 of the machine. Recess 44 carries a longitudinally slidable, slide valve member 38 of modified circular cross-section and sealably slidable within that recess. The slide valve member 38 bears a piston rod 46 to which it is fixed, and the longitudinal position of the slide valve member 38 within recess 44 is adjusted by means of a linear fluid motor 51 connected to rod 46 at the end opposite slide valve member 38. A power piston cylinder 50 is fixedly mounted to the casing structure as an extension to section 14, and slidably mounts a power piston 48 bearing a seal 49 on its periphery. A fixed end cap 52 closes off the left end of the cylinder 50 and defines a sealed working chamber 54 within the cylinder 50, along with end wall section 14. The end wall section 14 bears an opening 53 within which slides the piston rod 46 with chamber 54 being sealed from the inlet passage 34 by way of an O-ring seal member 55 suitably carried within the casing end wall section 14 at opening 53. The inner face 56 of the slide valve member 38 confronting the rotors 20, 21 is shaped to provide a replacement for the cutaway portion of the casing section 12 defining the bore so as to complete the compression envelope for the intermeshed helical screw rotors. The left end of the slide valve member 38 slidably and sealably engages a recess portion 60 of the end wall section 14 of the casing, such that regardless of the position of the slide valve member 38, the slide valve member 38 is of a sufficient length to cover the entire remaining length of the confronting portion of the rotor structure throughout its range of movement between extreme positions as determined by recess portion 60 and the abutting contact or end face 62 of the slide valve member 38 with the outlet end wall section 16 of the casing structure which also sealably receives a portion of the same. Face 56 of the slide valve is chevron-shaped with its center line constituting an apex at the point of intermesh between the confronting rotors.

During compression, an elastic working fluid such as a gaseous refrigerant R22 or the like is drawn into and fills the grooves of the rotors 20, 21 through the inlet port 36. As the rotors revolve, mating pairs of lands of the male and female rotors intermesh at the bottom of the compressor to form chevron-shaped working chambers. As the rotors continue to revolve, these working chambers, which constitute compression chambers or closed threads (when the machine is functioning as a compressor), diminish in volume as the point of intermesh between any two lands determines the apex end of the given compression chamber or thread, move axially towards high pressure end wall 64 for casing section 16 (when the unit functions as a compressor) to diminish the volume of the compression chamber until the compressor runs out to zero bottom as the point of intermesh reaches the plane of the outlet end wall 64. Closure of the compression chamber is effected by the inner face of the slide valve member 38 which is in confronting and sealing relation with the crest of the land defining the boundaries of the compression chambers of closed threads.

Discharge of compressor working fluid in this case is effected when the crests of the rotor lands defining the leading edge of the compression chambers pass a control edge 66 of the slide valve member 38 at right end 62 of that member to establish communication between the closed thread or chamber just prior to discharge at the outlet port 40 with the outlet port 40. Movement of slide valve 38 to the left shortens the time of compression, while movement to the right increases the time of compression and increases the compressor pressure ratio between suction and discharge of the compressor when acting under compressor mode. Thus, assuming that the initial volume of the closed thread prior to that thread reaching edge 66 of the slide valve member 38 remains constant, the slide valve member 38 may vary the compression ratio of the compressor. This in effect controls the pressure of the discharge gas from the closed thread to the outlet port 40.

One aspect of the present invention is therefore identical to that of my earlier U.S. Pat. No. 3,936,239 in that the composite slide valve assembly indicated generally at 11 utilizes the slide valve member 38 to match a closed thread or working chamber fluid pressure at its outlet or dicharge point, as determined by edge 66 of the slide valve member 38, to the outlet or discharge pressure within the discharge passage 42 at the discharge port 40. This permits efficiency of the system in which the machine is employed to be improved since when the unit functions as a compressor, there will be no working fluid undercompression or overcompression or, alternatively, if the unit or machine 10 is employed as an expander, there will be no working fluid underexpansion or overexpansion as the high pressure working fluid expands from inlet port 36 to outlet port 40. Thus, the machine of the illustrated embodiment of the present invention may be utilized both as an expander and compressor without physical change and employs advantageously both volumetric capacity control and pressure matching, with vapor inlet always through port 36.

With respect to the pressure matching function of the unitary slide valve assembly 11, the slide valve member 38 is automatically shifted to match the closed thread or working chamber pressure just upstream from its outlet or discharge port to the discharge or outlet passage pressure at the outlet port 43. A vertical small diameter passage 70 in the form of a drilled hole, opens to the inner surface 56 of the slide valve member 38 at sensing port 72, just upstream of the edge 66 of that member, to permit sampling of the pressure of the working fluid just prior to discharge. The slide valve member 38 is longitudinally bored at 74 from left end 76 to passage 70.

Further, the piston rod 46 is hollow, being centrally bored at 80 and is provided with a radial port 82 which connects via tube 78 to bore 74 carried by slide valve 38 such that the sensing port pressure at sensing port 72 is transmitted through the length of the hollow piston rod 46 towards piston 48. The piston rod bore 80 is plugged at one end as at 81. A yoke member 83 connects the piston rod 46 to the slide valve member 38. Fixed to the end cap 52 at its center is a smaller diameter tube 84 which is slidably received by bore 80 of the hollow piston rod 46 with which it makes sealed surface contact. Further, the end cap 52 is provided with a radial fluid passage 86 which opens to the end of the fixed tube 84.

The illustrated embodiment of the invention employs a pilot valve indicated generally at 92 which operates in the identical manner to my earlier U.S. Pat. No. 3,936,239. In that respect, the pilot valve 92 is provided with a pilot valve casing 90 of cylindrical form defining a longitudinal bore 94 within which lies an axially shiftable pilot valve spool 96 comprising four axially spaced lands 98, 100, 102 and 104 which are in sealing contact with the bore 94 of the pilot valve casing 90. The lands are joined by reduced diameter portions 106. The valve casing 90 at its ends is provided with axial ports 108 and 110 to the left and right, respectively.

In addition to the axial end ports 108 and 110 at the left and right ends of the cylindrical pilot valve casing 90, there is provided an inlet port 112 which opens up radially to the interior of the casing intermediate of its ends. A hydraulic pressure working fluid, indicated schematically by arrow 116, is fed to the inlet port 112 through a line 114 leading from a supply (not shown). Ports 118 and 120 open up radially to the interior of the valve casing, to opposite sides of port 112, and constitute discharge ports and are fluid connected to a common discharge line 122 discharging fluid from the pilot valve as indicated by arrow 124. On the opposite side of the pilot valve casing 90, there are provided fluid ports 126 and 128 which lead by way of lines 130 and 132 to the chamber 54, and respectively to the left and right sides of the power piston 48. Line 88 leads from passage 86 to axial port 108, and a line 136 leads from axial port 110 to the pilot valve to the outlet passage 42 of the machine.

In the fashion of U.S. Pat. No. 3,936,239, lands 98 and 104 function, due to identical surface areas on their ends thereof, as comparing means to compare the pressure of the closed thread at sensing port 72 to the discharge or outlet pressure of the unit. The pilot valve spool 96 shifts to the right or left, depending upon whether the pressure within the discharge passage 42 of the unit is higher than the pressure within the closed thread sensed by port 72 at any instant, or vice versa. With the pilot valve spool 96 in the position shown, the working fluid 116 passes to the left side of the power piston 48, causing the piston 48 to move to the right as working fluid within chamber 54 to the right of that piston passes to the outlet line 122 through line 132. This causes the compression process to continue to discharge gas at a higher pressure through the discharge port 40 into the outlet or discharge passage 42. When that discharge pressure exceeds the pressure exerted on the pilot valve spool 96 by way of the closed thread, the power piston 48 is forced to move to the left, shifting the slide valve member 38 to again balance these pressures by causing the closed thread to open to the discharge port or outlet port 42 at lower compression, earlier in the compression cycle.

An important aspect of the present invention, in particular, is the dual function of slide valve assembly 11, by the incorporation within the slide valve member 38 of means for varying the volumetric capacity of the machine independently of and without interference with the function of the slide valve member 38 in matching the pressures between the closed thread pressure just prior to discharge and that of the discharge or outlet passage at the outlet port 40. In this respect, the slide valve member 38 is provided at its inner face 56 with two rows of inclined, longitudinally spaced and generally parallel channels 140 which in fact may be at some inclination angle to pressure sensing passage 70. The channels 140 which open to respective intermeshed rotors 20 and 21 at the inner face 56 of the slide valve member 38, extend along the length of the slide valve member from just to the left of the port 72 to very near the left end 76 of the slide valve member 38. Further, the slide valve member 38 is provided with a relatively large circular bore as at 142 which extends inwardly and to the right from end 76 of that member, preferably the full length of the slide valve member 38. A cylindrical volumetric capacity control valve body indicated generally at 146, having a bore 148 is sized to match bore 142 of the slide valve member 38 within which it is concentrically mounted for rotation about its axis. The rotary volumetric capacity control valve member 146 is mounted for relatively free rotation about the axis of the piston rod 46 but is prevented from the shifting axially with respect to that member so as to be maintained in an axially fixed position.

The valve body 146 periphery bears a recess 152 over a portion of its periphery which follows a helical path about the periphery of the valve body, conforming to the helical pitch for the lands and grooves of the intermeshed helical screw rotors 20 and 21 forming a helical flow control edge or helix 154. Thus, depending upon the angular position of the valve body 146 with respect to the piston rod 46 which rotatably supports the same, the radially inboard ends of the channels 140 are selectively uncovered by control edge 154 to permit the flow of inlet working fluid prior to compression (when the unit functions as a compressor) or prior to expansion (when the unit functions as an expander) to return to the inlet or suction passage 34, thus decreasing the volume of working fluid discharging at edge 66 of the slide valve member 38.

As mentioned previously, the action of the capacity control slide valve body 146 is independent of the action of the slide valve member 38 which functions in pressure matching mode. In that respect, the casing section 16 supports for sliding movement, a rack bar 160. The rack bar 160 preferably is slidably mounted within a bore 162 which is formed within the casing section 16 at right angles to the axis of the piston rod 46 and its supported cylindrical capacity control valve body 146, to the side of the valve body 146 at one end thereof. The rack bar 160 bears rack teeth 164 on the surface which faces the periphery of the valve body 146, and the valve body 146 itself is provided with matching gear teeth defining a pinion gear 147 for the rack such that as the rack is moved in one direction along its longitudinal axis, the valve body 146 rotates so that control edge 154 closes off in succession the channels 140 from right to left, thereby increasing the capacity of the machine. To the contrary, when the rack is moved in an opposite direction and the valve body rotates clockwise about its axis when viewed from the left end of the machine, FIG. 1, the helix 154 uncovers a larger number of the channels 140 from left to right returning more of the working fluid prior to compression and thereby decreasing the volumetric capacity of the machine.

In order to effect volumetric capacity control, the rack bar 160 terminates at one end in a piston 166 forming a part of a hydraulic linear motor 168. A cylinder 170 defines a working chamber 171 which carries piston 166. A first hydraulic port 172 opens to cylinder 170 on one side of the piston 166, while a second hydraulic line port 174 opens to the cylinder 170 on the opposite side of piston 166. As indicated in FIG. 3, by the application of a hydraulic fluid under pressure, as by way of arrow 176, and by release of hydraulic fluid on the opposite side of piston 166 through port 172, as per arrow 178, the rack is moved upwardly with respect to the valve body 146 and the valve body 146 is rotated counterclockwise (when viewed from the right) to unload the machine. By applying hydraulic liquid under pressure to port 172 and relieving it through port 174, loading is achieved, and the cylinder valve body 146 will rotate in a clockwise direction about its axis of rotation when viewed from the right end of the apparatus. The rotary valve body 146 is sized so as to closely seal off the bore 142, although rotation of the valve body 146 is permitted relative to the slide valve member 38 bearing the same. Further, the rack and pinion gear means permits the valve body to be carried by the slide valve member 38 without interference to the gear connection therebetween.

It is important to note that, not only is the efficiency of the system improved by the pressure matching function of the slide valve member 38, but the utilization of the rotary valve 146 for varying the volumetric capacity of the machine when load requirements are reduced greatly reduces the horsepower required to effect the compression process, although compression ratio of the compressor remains constant throughout the volumetric capacity variation from full load to full unload. In that regard, FIG. 1 shows the helical screw positive displacement machine 10 under conditions in which the unit is functioning as a compressor with low volumetric capacity, the capacity control valve body 146 rotated counterclockwise to open most of the channels 140 to the inlet passage 34. Slide valve member 38 is at near full compression. In contrast, FIG. 3 shows the slide valve member 38 shifted to the left. The machine is unloaded completely, and the rotary volumetric capacity control valve body 146 has been rotated clockwise by applying high pressure hydraulic liquid to port 172 to the upper side of the piston 166 and bleeding port 174 at the lower face of the power piston 166, forcing that piston 166 downwardly within cylinder 168 and causing the rotation of the valve body 146 clockwise when viewed from the right end of the assembly. This uncovers all of the channels 140, permitting the compressor working fluid to return to the inlet side of the machine by way of inlet passage 34, along the surface portion 146a without compression.

As seen in FIG. 3, with the machine fully unloaded, there is effectively a direct fluid path from the inlet port 36 to the outlet port 40 of the machine by way of the helical recess 156 of the rotary valve member 146 and partially by way of bore 142 within slide valve 38. This permits at start up or prior to start up the full unloading. In an operative system, check valves may be provided at the inlet or outlet or both, the control system may incorporate an electronic computer or the like for permitting under certain circumstances such as start up or just prior to start up, full unloading of the machine, while under other circumstances regardless of normal system design, rotation of the capacity control valve body 146 may be effected to in fact prevent full unloading.

The effect is to maintain the same compression ratio of the machine but reducing the work of the two speed synchronous induction motor M acting to drive the compressor through shaft 22 by way of spline 32.

The unit of the illustrated embodiment may function either as a compressor or an expander, with the working fluid at low pressure when the unit functions as a compressor entering the inlet passage 34 at inlet port 36 for compression prior to discharge at outlet port 40. Alternatively, if the unit is being employed as an expander, in that case, the slide valve 38 functions as a pressure matching control means for the expansion process, while the rotary volumetric capacity control valve body 146 carried by the slide valve member 38 functions to independently control the volumetric capacity of the machine. If the unit is to be employed as an expander, and there is no necessity to reverse the flow, that is, cause the high pressure working fluid to enter the outlet passage 42 and flow to the inlet passage 34 or low pressure end of the machine, as in conventional compressor/expander units, the inlet passage 34 always receives the working fluid on the inlet side of the machine, regardless of whether it is a high pressure or low pressure fluid. Thus, with the positive displacement machine 10 functioning as an expander, the pressurized working fluid enters the inlet 34 and expands forcing the rotors to rotate and in this case to drive the two speed synchronous induction electric motor M rotor R with respect to the stator 8 to deliver electrical current through leads L. When using the unit as an expander, the slide valve member 38 continues to function as a pressure matching means, sensing the expanded working fluid within a closed thread at port 72 just before discharge at the outlet port 40 and making sure that the pressure in the closed thread matches that at port 40 so that there will be no underexpansion or overexpansion of the working fluid being expanded. Likewise, depending upon the system load being sensed by means (not shown), hydraulic liquid is delivered to one side of the power piston 166 and relieved from the other side to cause the rack bar 160 to rotate the rotary capacity control valve body 146 about its axis to vary the volume of working fluid being expanded and thus the capacity of the expander. In each case, the efficiency of the machine and the efficiency of the system employing that machine is maximized by the utilization of the single assembly 11 to accomplish a two part purpose.

Further, in order to maintain sufficient variation in load bearing capability of the machine, the two speed synchronous induction range normally limited by the range of longitudinal movement of the slide valve member 38 to effect pressure matching, such that by doubling the speed of rotation of the intermeshed helical screw rotors 20 and 21, the volumetric capacity of the machine may be essentially doubled, regardless of pressure matching needs.

When using the unit as an expander, and also utilizing a reverse flow direction, as compared to the flow direction when operating as a compressor, slide valve 38 will function as an inlet volumetric control and not as a pressure matching control. When operating with this reverse flow direction, cylindrical valve body 146 will then operate as an approximate pressure matching control. However, the rotary position of cylindrical valve body 146 will be determined via a preprogrammed relationship that will utilize inlet pressure, outlet pressure, and position of slide valve 38 as sensory inputs. In other words, the correct expansion ratio will be determined by measuring the inlet pressure to the expander, the outlet pressure the expander is dumping into, and the relative load on the expander as measured by position of slide valve 38.

This reverse flow situation is desirable under conditions whereby asymmetrical profile rotors are utilized and an unequal blowhole relationship exists when operating as either as expander or a compressor with no change in flow direction. Typical circular profile rotors do not have this difference in blowhole size.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a positive displacement helical screw rotary machine for functioning either as a compressor or an expander and including a casing provided with a barrel portion defined by intersecting bores, with coplanar axes located between axially spaced end walls and having inlet and outlet ports in communication with the bores at opposite ends, helical screw rotors each having grooves and lands being mounted for rotation within respective bores with the lands and grooves of respective rotors intermeshed, an axially extending recess provided within the barrel portion of the casing in open communication with said bores and a slide valve member mounted for axial sliding within the recess with the inner face of the slide valve member being complementary to the envelope of that portion of the bores of the casing structure confronted by the opening of the recess and with the slide valve member communicating the bore portion of the casing structure with the slide valve member in sealing relation with the confronting rotor structure, the outlet port having at least a portion located in the barrel portion of the casing structure, with the slide valve member being movable between extreme positions in which the outlet port is open and closed, said slide valve member being of sufficient length to cover the entire remaining length of the confronting portion of the rotor structure throughout the range of movement of the slide valve member between its extreme positions, pressure sensing means provided adjacent to the end of the slide valve member closing off the outlet port to the closed thread for sensing the pressure of the working fluid within the closed thread just upstream from the outlet port, means for comparing the pressure of the outlet port to the closed thread pressure at said outlet port, and means for automatically shifting the slide valve axially to equalize these pressures to prevent undercompression or overcompression of the working fluid when the unit is functioning as a compressor and for preventing underexpansion or overexpansion of the working fluid when the unit is functioning as an expander to maximize machine efficiency in respective modes, the improvement residing in an axial bore within the slide valve member, a plurality of longitudinally spaced overflow channels in the slide valve member inner face communicating the inner face partially defining the envelope of the intermeshed screw rotors to said axial bore and means communicating the axial bore to the inlet port of said machine, a cylindrical volumetric capacity control valve body movably disposed within said slide valve member bore in sealing fashion therewith and including means responsive to shifting of the valve body for selectively covering and uncovering the overflow channels and communicating the slide valve member bore to the working chamber bearing the intermeshed helical screw rotors, and means for effecting control movement of said valve body relative to said valve member bore.

2. The positive displacement helical screw rotary machine as claimed in claim 1, wherein said shiftable cylindrical valve body is mounted within said slide valve member bore for rotation about its axis, and wherein the periphery of said valve body is recessed so as to define a control edge of varying axial extent from one end face towards the other about the circumference thereof so as to variably communicate said overflow channels to said inlet passage as said cylindrical valve body is rotated about its axis.

3. The positive displacement helical screw rotary machine as claimed in claim 1, wherein said means for moving said cylindrical valve body with respect to said slide valve body member bore comprises a rack bar mounted for axial movement along a path at right angles to the axis of said cylindrical valve body to the side of said valve body and including rack teeth on the side thereof facing the periphery of the rotary cylindrical valve body, and wherein said cylindrical valve body bears at least on a portion of its periphery, gear teeth which are in mesh with the rack gear teeth, and means for shifting said rack bar axially to cause said rotary cylindrical valve body to rotate about its axis and to selectively communicate an overflow channel to said inlet passage.

4. The positive displacement helical screw rotary machine as claimed in claim 1, further comprising a two speed synchronous induction motor operatively coupled to one of said rotors to drive said machine, such that when said inducation motor is operated at high speed is essentially doubles the volumetric capacity of the machine without adversely affecting the pressure matching function of said slide valve member.

*5. In a positive displacement helical screw rotary machine functioning either as a compressor or an expander and including a casing provided with a barrel portion defined by intersecting bores with coplanar axes located between axially spaced end walls and having inlet and outlet ports in communication with the bores at opposite ends, helical screw rotors, each having grooves and lands and being mounted for rotation within respective bores with lands and bores of respective rotors intermeshed, an axially extending recess provided within the barrel portion of the casing in open communication with said bores, and a slide valve member mounted for axial sliding within the recess with at least a portion of the interface of the slide valve member being complementary to the envelope of that portion of the bores of the casing structure confronted by the opening of the recess and with the slide valve member communicating the bore portion of the casing structure with the slide valve member in sealing relation with the confronting rotor structure, the outlet port having at least a portion located in the barrel portion of the casing structure, with the slide valve member being movable between extreme positions in which the outlet port is open and closed, said slide valve member being of sufficient length to cover the entire remaining length of the confronting portion of the rotor structure throughout the range of movement of said slide valve member between extreme positions, pressure sensing means provided adjacent to the end of the slide valve member closing off the outlet port to the closed thread for sensing the pressure of the working fluid within the closed thread just upstream from the outlet port, means for comparing the pressure of the outlet port to the closed thread pressure at the outlet port, and means for automatically shifting the slide valve member axially to equalize these pressures to prevent undercompression or overcompression of the working fluid when the unit is functioning as a compressor and for preventing underexpansion or overexpansion of the working fluid when the unit is functioning as an expander to maximize machine efficiency in respective modes, the improvement comprising:*

*an arcuate opening within said slide valve member,*

*an arcuate volumetric capacity control valve body slidably and sealably fitting said arcuate opening within said slide valve member,*

*means including said arcuate volumetric capacity control valve body for communicating the inlet port of said machine to said working chamber bearing the intermeshed helical screw rotors,*

*means responsive to shifting of the valve body relative to the slide valve member for varying communication between said inlet port of said machine and said working chamber, and*

*means for effecting controlled movement of said valve body relative to said slide valve member for varying the capacity of said positive displacement helical screw rotary machine.*

* * * * *